United States Patent
Why et al.

(10) Patent No.: US 7,215,374 B2
(45) Date of Patent: May 8, 2007

(54) CAMERA MODULE HAVING GEARED LENS BARREL

(75) Inventors: Tan Cheng Why, Bukit Tengah (MY); Yong Wen San, Selango (MY)

(73) Assignee: Micron Technology, Inc., Boise, ID (US)

( * ) Notice: Subject to any disclaimer, the term of this patent is extended or adjusted under 35 U.S.C. 154(b) by 765 days.

(21) Appl. No.: 10/336,358

(22) Filed: Jan. 3, 2003

(65) Prior Publication Data
US 2004/0130656 A1 Jul. 8, 2004

(51) Int. Cl.
*H04N 4/225* (2006.01)

(52) U.S. Cl. ...................... 348/374; 348/340

(58) Field of Classification Search ........ 348/373–375, 348/340; 396/72, 73, 75, 529; 250/216
See application file for complete search history.

(56) References Cited

U.S. PATENT DOCUMENTS

| | | | |
|---|---|---|---|
| 3,827,779 A * | 8/1974 | Hapke et al. ............... | 359/826 |
| 3,888,568 A | 6/1975 | Norris et al. | |
| 5,486,860 A * | 1/1996 | Shiokawa et al. .......... | 348/354 |
| 5,530,502 A * | 6/1996 | Petruchik ................... | 396/411 |
| 6,115,197 A * | 9/2000 | Funahashi .................. | 359/826 |
| 6,483,101 B1 * | 11/2002 | Webster ..................... | 250/216 |
| 2002/0030756 A1 * | 3/2002 | Inoue ......................... | 348/345 |

FOREIGN PATENT DOCUMENTS

| CN | 1120638 A * | 4/1996 |
|---|---|---|
| JP | 63314510 A | 6/1987 |

* cited by examiner

*Primary Examiner*—Ngoc-Yen Vu
*Assistant Examiner*—Adam L Henderson
(74) *Attorney, Agent, or Firm*—RatnerPrestia

(57) ABSTRACT

A camera having a housing, an imaging array positioned in said housing, and a lens assembly is disclosed. The lens assembly includes a fixed portion attached to the housing and a moveable portion connected to the fixed portion by a threaded coupling. The lens is positioned in the moveable portion to image a scene on the imaging array. The lens is separated from the imaging array by a distance that changes as the moveable portion is rotated relative to the fixed portion. The moveable portion includes a gear for applying a torque to the moveable portion such that the moveable portion moves relative to the fixed portion. The gear is preferably a spur gear. During the assembly of the camera, the gear is turned via a second gear such that the position of the lens is moved to a predetermined desired position.

6 Claims, 2 Drawing Sheets

CAMERA MODULE HAVING GEARED LENS BARREL

FIELD OF THE INVENTION

The present invention relates to cameras.

BACKGROUND OF THE INVENTION

Small, inexpensive, cameras for use with computers are commonplace. These cameras are constructed from an imaging array and a lens that is set at a fixed distance from the imaging array. The lens position is normally set during the final stages of production. Typically, the position of the lens relative to the imaging array is measured after the camera is assembled. The lens is then moved to the correct position by turning the lens in a screw mount a fixed number of turns to bring the lens-imaging array distance to the correct value. Once the position of the lens is set, the lens is immobilized so that the distance from the lens to the imaging array cannot be changed.

The cost and accuracy of this adjustment depends on being able to rotate the lens a known angular distance. If the device that moves the lens is inaccurate or has backlash, or slips, the final positioning will be inaccurate and the product will not function properly. This will be reflected in a lower device yield and higher device prices.

SUMMARY OF THE INVENTION

The present invention includes a camera having a housing, an imaging array positioned in said housing, and a lens assembly. The lens assembly includes a fixed portion attached to the housing and a moveable portion connected to the fixed portion by a threaded coupling. The lens is positioned in the moveable portion to image a scene on the imaging array. The lens is separated from the imaging array by a distance that changes as the moveable portion is rotated relative to the fixed portion. The moveable portion includes a gear for applying a torque to the moveable portion such that the moveable portion moves relative to the fixed portion. The gear is preferably a spur gear. During the final adjustment of the lens in the camera, a series of images are imaged onto the imaging array to determine the current position of the imaging array. The gear is then turned via a second gear such that the position of the lens is moved to a predetermined desired position.

DETAILED DESCRIPTION OF THE PREFERRED EMBODIMENTS OF THE INVENTION

Figure 2:
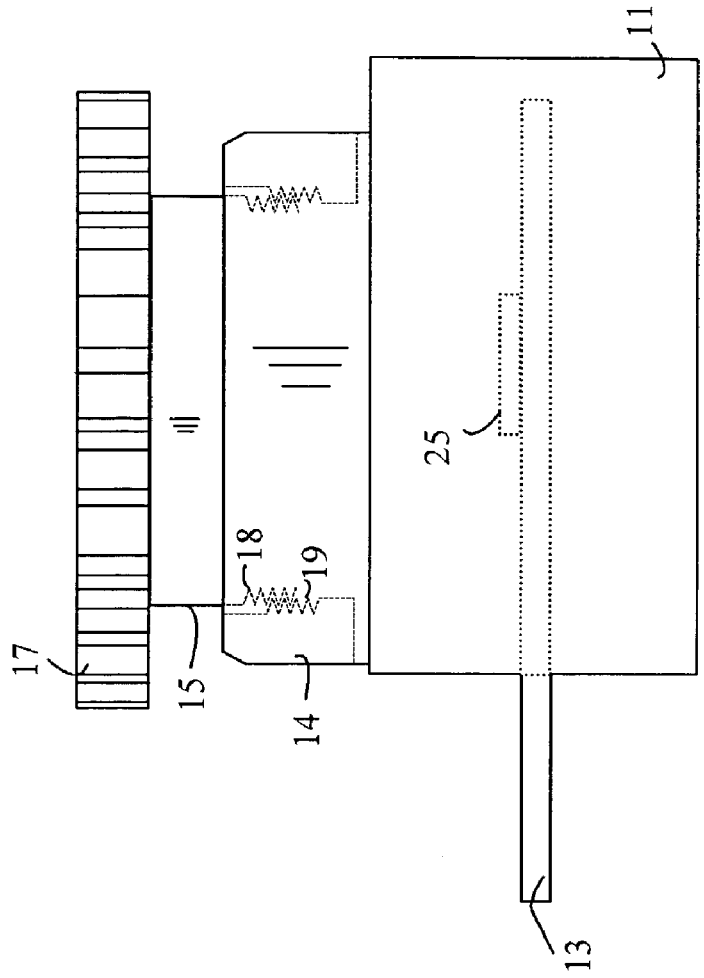
FIG. 2 is a side view of camera 10.
Figure 1:
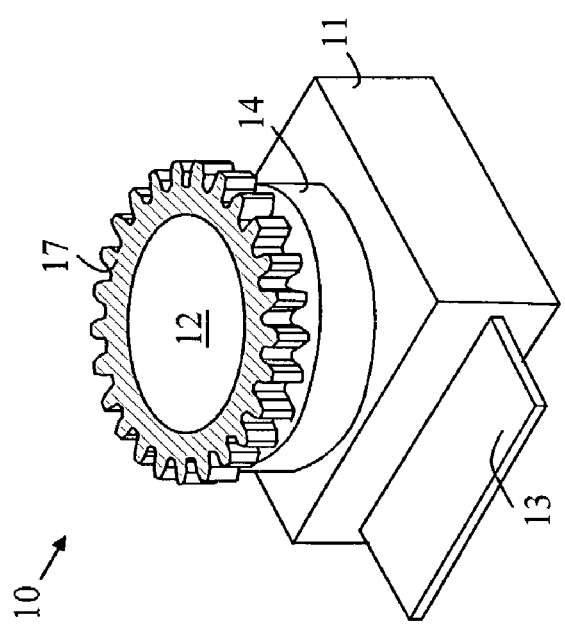
FIG. 1 is a perspective view of a camera 10 according to the present invention.

The manner in which the present invention provides its advantages can be more easily understood with reference to FIGS. 1 and 2, which illustrate a camera 10 according to one embodiment of the present invention. FIG. 1 is a perspective view of camera 10 and FIG. 2 is a side view of camera 10. Camera 10 includes an imaging array 25 which is attached to a printed circuit board 13 that positions the imaging array within housing 11 and holds the imaging array in a fixed position relative to a lens barrel assembly. The lens barrel assembly consisting of a fixed portion 14 that is part of the housing and a moveable barrel 15 that screws into the fixed portion with the aid of the threads shown in phantom at 18 and 19. When barrel 15 is rotated relative to fixed portion 14, the distance from lens 12 to the imaging array is varied. The present invention utilizes a gear wheel 17 to rotate barrel 15. While lens 12 is shown at the end of barrel 15, it should be understood that lens 12 can be located within barrel 15 and may include other optical elements or a dust cover.

The portion of the printed circuit board 13 that protrudes from the housing serves as a connector for connecting the camera to the external electronics that utilize the images taken by the camera.

Figure 3:
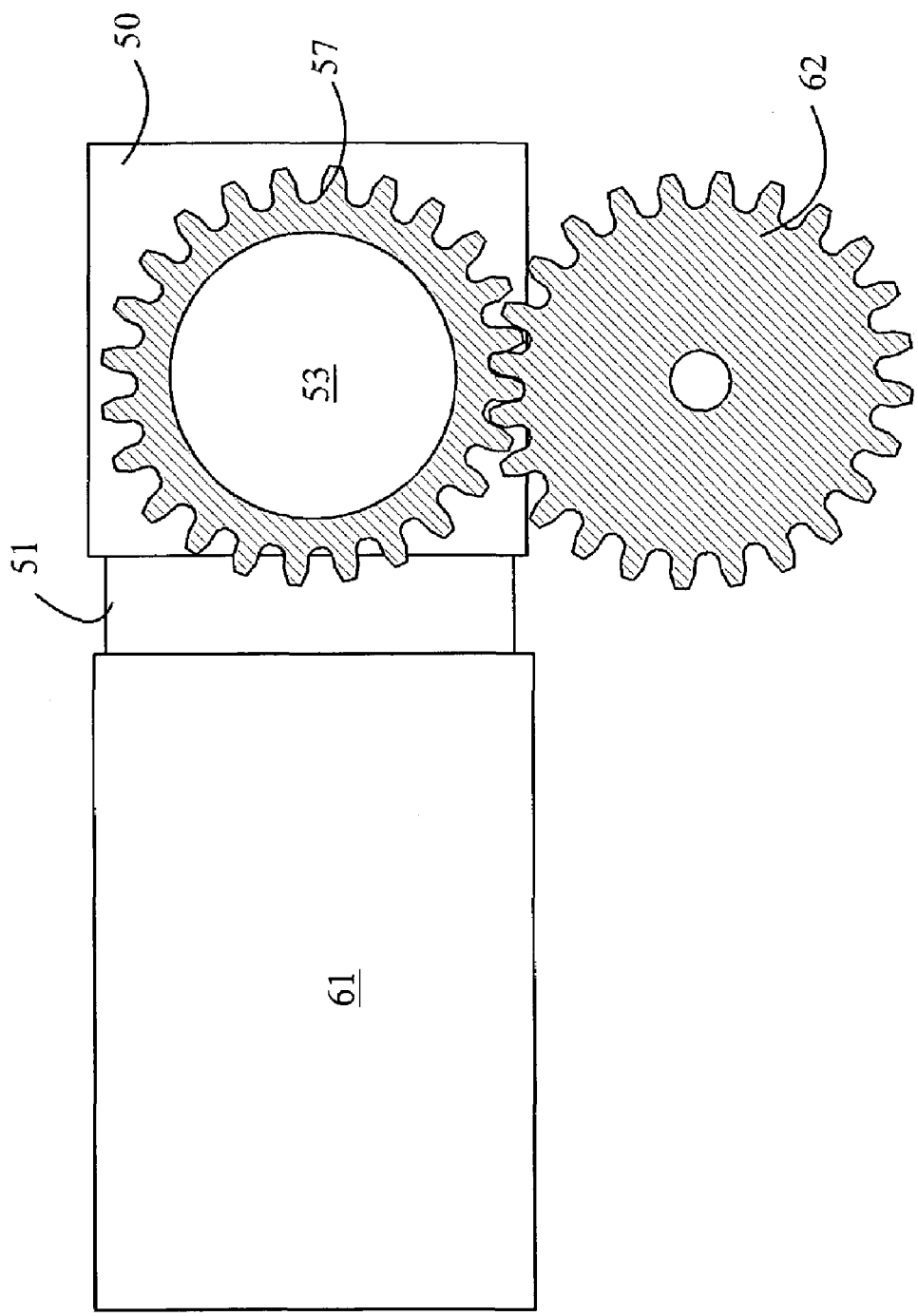
FIG. 3 is a top view of a camera 50 according to the present invention attached to a test system during the final lens adjustment.

Refer now to FIG. 3, which is a top view of a camera 50 attached to a test system during the final lens adjustment. After the camera has been assembled, the camera is connected to a test system connector 61 via the connector 51 on the camera. The test system electronics readout the images formed by the camera when a test image is photographed by the camera. An adjustment wheel 62 engages the gear wheel 57 on camera 50 and rotates the lens barrel such that the test image is properly focused on the imaging array in the camera. After the lens 53 is correctly positioned, the lens moveable barrel is fixed in position by welding the moveable barrel to the fixed portion.

In one preferred embodiment of the present invention, the distance of the lens from the imaging array is determined by analyzing the images generated by the imaging array when a test image is imaged on the imaging array. If the image is out of focus, the position of the lens is adjusted and the process is repeated until the test image is in focus. The lens is moved by adjustment wheel 62 during this process. Movement may occur in either direction of rotation during the adjustment process; hence, any backlash in the adjustment mechanism will limit the accuracy of the lens adjustment and/or time needed to make the adjustment.

In the above-described embodiments of the present invention, the gear wheels utilize spur gears, since this type of gear has minimal slippage or backlash. However, other gear systems having low slippage or backlash may also be utilized. For example, cycloid gears also have minimal slippage and backlash.

Various modifications to the present invention will become apparent to those skilled in the art from the foregoing description and accompanying drawings. Accordingly, the present invention is to be limited solely by the scope of the following claims.

What is claimed is:

1. A camera comprising:
   a housing;
   an imaging array positioned in said housing;
   a lens assembly comprising a fixed portion attached to said housing and a moveable portion connected to said fixed portion by a threaded coupling and having a lens therein positioned to image a scene on said imaging array and separated from said imaging array by a distance that changes as said moveable portion is rotated relative to said fixed portion, said moveable portion including a gear, said moveable portion being permanently fixed to said fixed portion after said camera is assembled such that said moveable portion no longer moves relative to said fixed portion after said camera is assembled.

2. The camera of claim 1 wherein said gear is a spur gear.

3. The camera of claim 1 wherein said gear is a cycloid gear.

4. A method for setting the position of a lens relative to an imaging array in a camera to a desired position, said method comprising:
 mounting said lens on a moveable barrel having a first near for rotating said barrel relative to a fixed housing containing said imaging array such that said position changes when said barrel is rotated;
 imaging a test image on said imaging array with said lens and determining if said test image is in focus;
 engaging said first gear with a second gear, external to said housing and said camera to cause said lens to move said lens;
 imaging said test image on said imaging array after said movement to determine if said test image is now in focus; and
 permanently immobilizing said barrel relative to said housing after said lens is moved to said desired position such that said barrel cannot move relative to said housing after said barrel is immobilized.

5. The method of claim 4 wherein said first and second gears are spur gears.

6. The method of claim 4 wherein said first and second gears are cycloid gears.

* * * * *

UNITED STATES PATENT AND TRADEMARK OFFICE
CERTIFICATE OF CORRECTION

| | | |
|---|---|---|
| PATENT NO. | : 7,215,374 B2 | Page 1 of 1 |
| APPLICATION NO. | : 10/336358 | |
| DATED | : January 3, 2003 | |
| INVENTOR(S) | : Tan Cheng Why et al. | |

It is certified that error appears in the above-identified patent and that said Letters Patent is hereby corrected as shown below:

Column 3, claim 4, line 7, delete "near" and insert -- gear --.

Signed and Sealed this

Sixteenth Day of October, 2007

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 7,215,374 B2 |
| APPLICATION NO. | : 10/336358 |
| DATED | : May 8, 2007 |
| INVENTOR(S) | : Tan Cheng Why et al. |

It is certified that error appears in the above-identified patent and that said Letters Patent is hereby corrected as shown below:

Column 3, claim 4, line 7, delete "near" and insert -- gear --.

This certificate supersedes Certificate of Correction issued October 16, 2007.

Signed and Sealed this

Thirteenth Day of November, 2007

JON W. DUDAS
*Director of the United States Patent and Trademark Office*